United States Patent [19]

Nakamura et al.

[11] Patent Number: 4,721,892
[45] Date of Patent: Jan. 26, 1988

[54] POWER SUPPLY APPARATUS FOR LINEAR MOTOR

[75] Inventors: Kiyoshi Nakamura, Katsuta; Masayoshi Isaka, Hitachi; Toyoharu Uchiyama, Hitachi, all of Japan

[73] Assignee: Hitachi, Ltd., Japan

[21] Appl. No.: 11,001

[22] Filed: Feb. 5, 1987

Related U.S. Application Data

[62] Division of Ser. No. 645,170, Aug. 28, 1984, Pat. No. 4,689,530.

[30] Foreign Application Priority Data

Aug. 31, 1983 [JP] Japan .................... 58-157857

[51] Int. Cl.$^4$ ............................................. H02K 41/00
[52] U.S. Cl. ........................................ 318/38; 318/135; 310/12
[58] Field of Search .................... 318/37, 38, 135, 121; 310/12-14; 104/292

[56] References Cited

U.S. PATENT DOCUMENTS

| 3,721,874 | 3/1973 | Pelenc | 310/12 X |
|---|---|---|---|
| 3,803,466 | 4/1974 | Starkey | 318/135 X |
| 4,068,152 | 1/1978 | Nakamura | 318/135 |
| 4,348,618 | 9/1982 | Nakamura | 318/135 |
| 4,361,095 | 11/1982 | Gibson | 104/292 |
| 4,454,457 | 6/1984 | Nakamura | 318/135 |
| 4,633,148 | 12/1986 | Prucher | 318/135 |
| 4,675,582 | 6/1987 | Hommes et al. | 318/38 |

Primary Examiner—Donovan F. Duggan
Attorney, Agent, or Firm—Antonelli, Terry & Wands

[57] ABSTRACT

Disclosed is a power supply apparatus for a linear motor transportation system having a number of discrete linear motor units serially arranged along a track to generate a moving magnetic field for driving vehicle. The apparatus comprises the linear motor units divided into a plurality of power supply systems each subdivided into a plurality of groups such that each of the power supply systems includes a series of ones of the linear motor units, the series of the linear motor units in each of the power supply systems being successively allotted to different ones of the groups; feeders provided respectively correspondingly to the groups in each of the power supply systems; feeder section switches for connecting respective one ends of the linear motor units in each of the group with corresponding ones of the feeders; a plurality of power supply devices provided respectively correspondingly to the groups in each of the power supply systems; and output side switches provided for connecting the respective outputs of the power supply device with corresponding ones of the feeders. The respective other ends of the linear motor units are connected with return path feeders and in each of the power supply systems, the series of linear motor units are successively excited by a corresponding one of the plurality of power supply devices as the vehicle runs.

8 Claims, 21 Drawing Figures

POWER SUPPLY APPARATUS FOR LINEAR MOTOR

This is a division application of Ser. No. 645,170, filed Aug. 28, 1984, now U.S. Pat. No. 4,689,530, 8/25/87.

The present invention relates to a power supply apparatus for a linear motor and particularly to a linear motor power supply apparatus suitable for use in a linear motor driving system in a railway of the magnetically floating type.

There have been proposed various kinds of driving systems for a surface primary type linear motor (also referred to as an elongated stator linear motor), in which a super conduction electromagnet is mounted as a field system on a vehicle which is a traveling body and a drive coil is provided on a track. FIG. 1 shows a typical example of the conventional linear motor power supply apparatus as disclosed, for example, in U.S. Pat. Nos. 4,068,152 and 4,348,618. That is, the drive coil provided on the track is divided into a plurality of linear motor units LM1, LM2, LM3, . . . , each unit being selected to be longer than the length of each vehicle TR and respective one ends of the units being connected alternately to a feeder FA for a group A and to a feeder FB for a group B through feeding section switches S1, S2, S3, . . . respectively. The other end of each linear motor unit is connected to a return path feeder FN commonly provided for the groups A and B. The feeders FA and FB are connected to the respective outputs of power converters PCA and PCB (for example, a cycloconverter, invertor, or the like) through switches SLA and SLB respectively. A superconduction electromagnet SCM is mounted on each vehicle TR. Although the driving coil for each linear motor is composed of three phase windings. Only one phase winding is shown in the drawing for the purpose of simplicity.

In such an arrangement, under the condition that the switches SLA and SLB at the output side of the power converters are closed, the switches S1, S2, S3, . . . are successively turned on/off as the vehicle TR travels to thereby continuously drive the vehicle. The method of on/off operation of these switches are disclosed in the above-mentioned U.S. Pat. No. 4,348,618.

In the conventional linear motor power supply apparatus of the kind as described above, there were various problems to be solved, mainly such as reduction in capacity of ground power supply equipment, reduction in variations in propelling or driving force and variations in power at the power reception side of power converters when a vehicle passes over two adjacent linear motor units, switch-over of each feeding section switch for connecting each linear motor unit to an associated power converter, etc. These problems have been completely or partly solved. Although the solution to these problems was important, however, in practical use it is strongly required to provide a power supply apparatus which operates as it was to make the vehicle run even in the case where a fault occurs in a part of the power supply apparatus constituted by the above-mentioned power converters, the feeding section switches, the linear motor units, etc.

In such a power supply apparatus as shown in FIG. 1, if a fault occurs, for example, in the power converter PCA, it becomes impossible to supply power to the linear motor units LM1, LM3 . . . of the group A. Accordingly, in linear motor section where power supply is stopped, the vehicle is supplied with no propelling or driving force so that it becomes into the state of coasting. That is, the vehicle is given only intermittent propelling or driving force by the linear motor units, LM2, LM4, . . . of the other group B, resulting in very poor ride comfort.

An object of the present invention is, therefore, to provide a linear motor power supply apparatus in which it is possible to make a vehicle continuously run by continuously giving propelling or driving force to the vehicle even if there occurs a fault in a part of the power supply apparatus to thereby improve running operation of the linear motor vehicle.

In order to attain the above-mentioned object, according to an aspect of the present invention, the power supply apparatus for a linear motor transportation system having a number of discrete linear motor units serially arranged along a track to generate a moving magnetic field for driving vehicle is featured in that the linear motor units are divided into a plurality of power supply systems each subdivided into a plurality of groups such that each of the power supply systems includes a series of ones of the linear motor units, the series of the linear motor units in each of the power supply systems being successively allotted to different ones of the groups, and in that the apparatus further comprises feeders provided respectively correspondingly to the groups in each of the power supply systems, feeder section switches for connecting respective one ends of the linear motor units in each of the group with corresponding ones of the feeders, a plurality of power supply means provided respectively correspondingly to the groups in each of the power supply systems, and output side switches provided for connecting the respective outputs of the power supply means with corresponding ones of the feeders, the respective other ends of the linear motor units being connected with return path feeders, whereby in each of the power supply systems, the series of linear motor units are successively excited by corresponding one of the plurality of power supply means as the vehicle runs.

Other objects, features and advantages of the present invention will become more apparent from the following description in conjunction of the accompanying drawings, wherein.

Referring to the drawings, preferred embodiments of the present invention will be described hereunder. In the drawings, the same numeral designates the same component or part.

Figure 1:
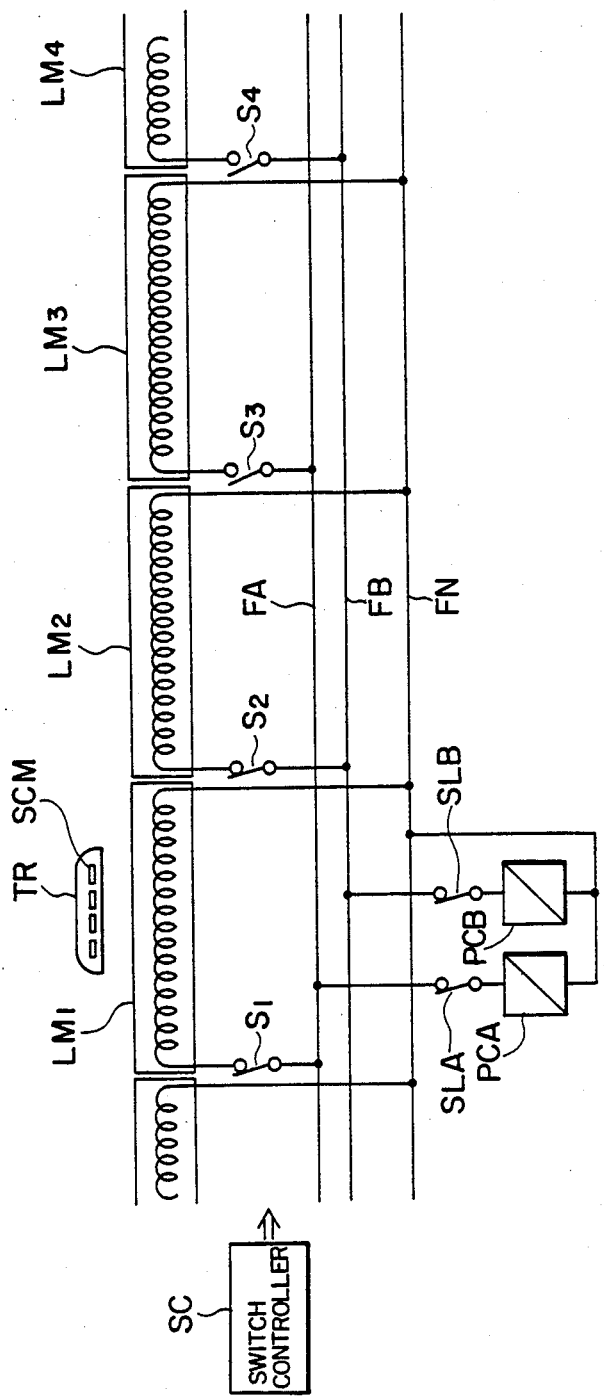
FIG. 1 is a circuit diagram of the conventional linear motor power supply apparatus.
Figure 2:
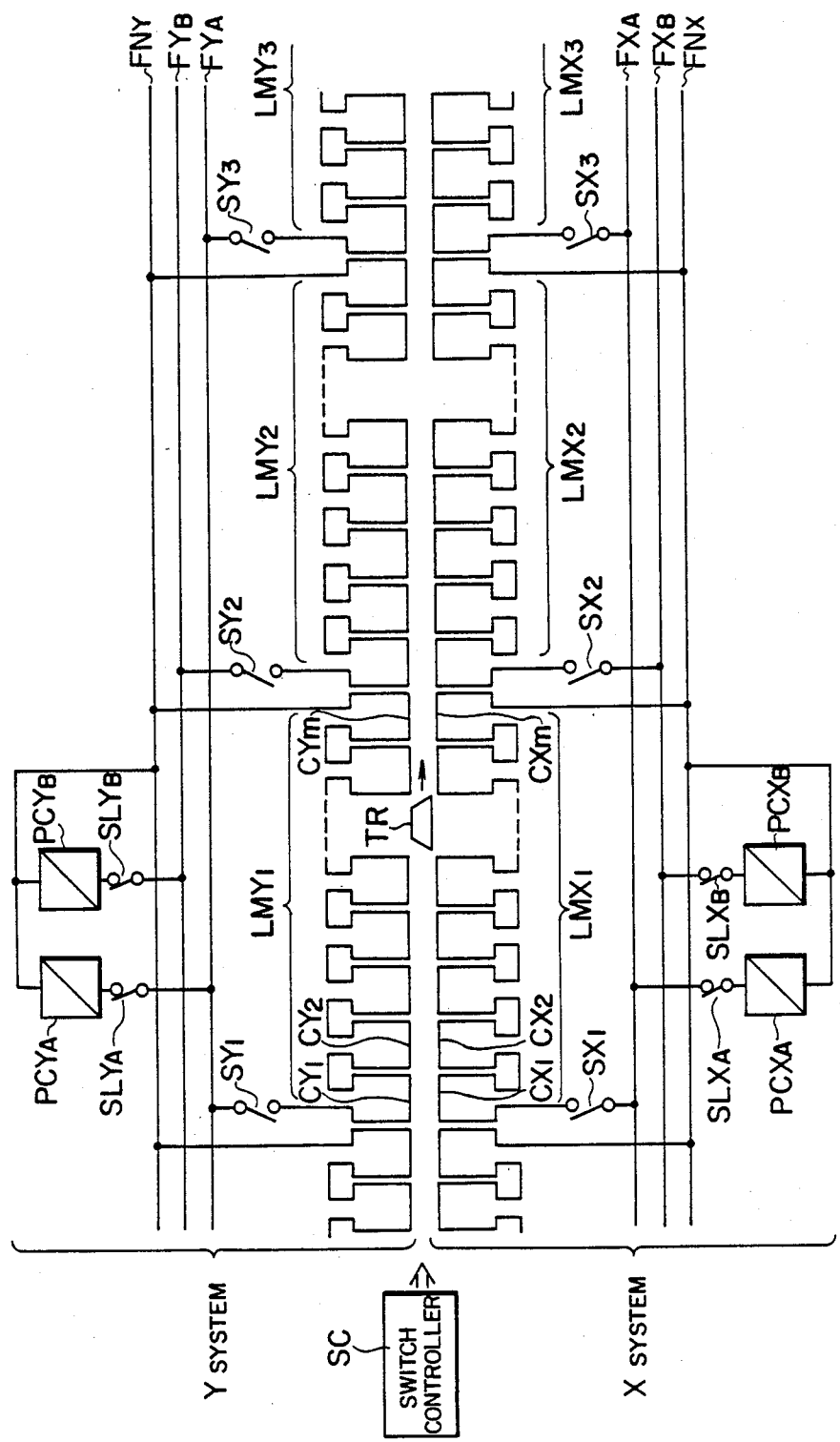
FIGS. 2 and 3 are circuit diagrams each showing a basic example of the linear motor power supply apparatus according to the present invention.
Figure 3:
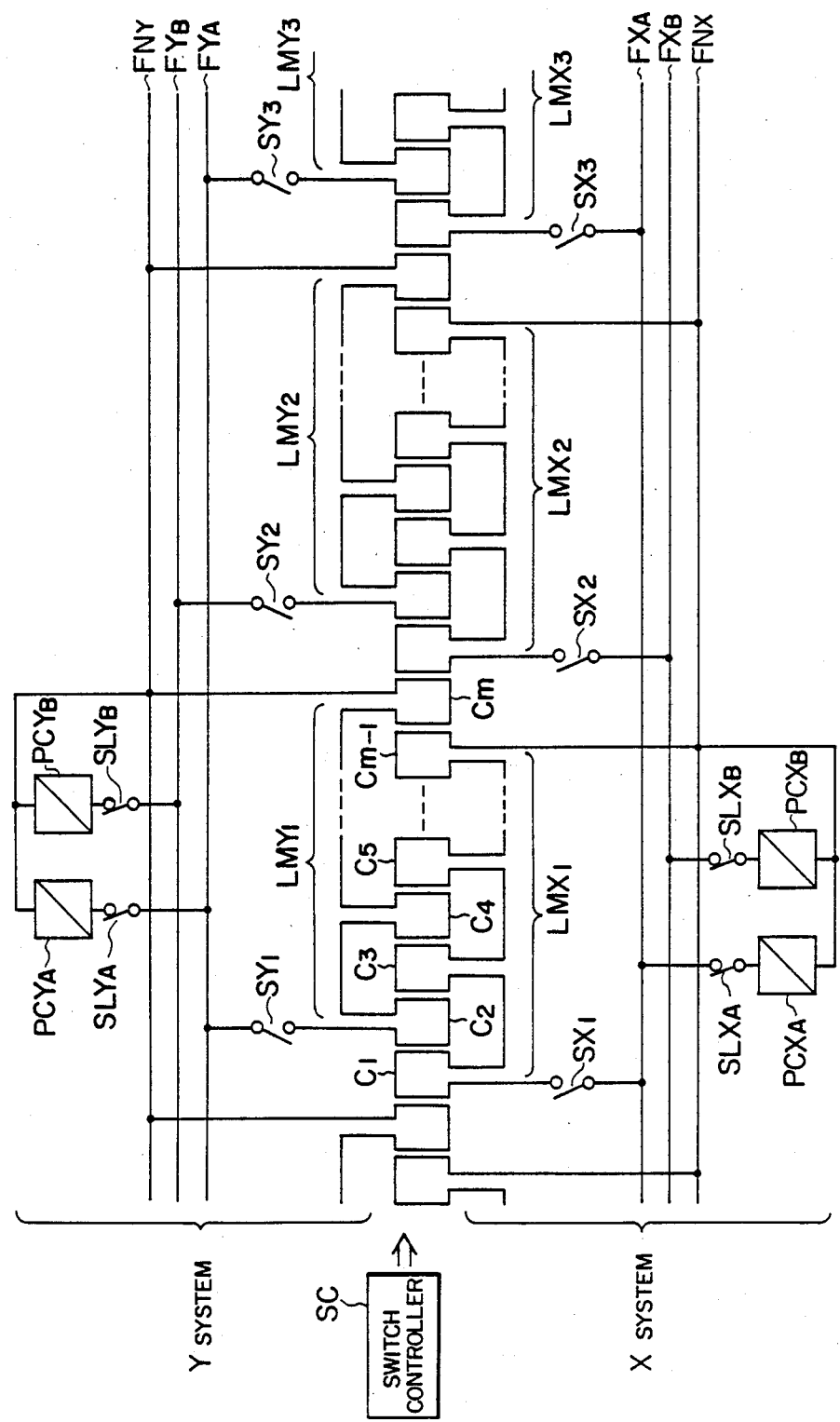

FIGS. 2 and 3 are circuit diagrams each showing a basic example of the linear motor power supply apparatus according to the present invention. That is, FIGS. 2 and 3 each shows the arrangement of an embodiment of the linear motor units in a multiplex power supply apparatus provided with a plurality of power supply systems shown in FIG. 1 (only two systems are shown in this embodiment because of simplicity of the drawings). Further, in these embodiments, the linear motor units of each system is divided into only two groups for the purpose of simplicity of the drawings.

FIG. 2 shows the arrangement of the linear motor units in the linear motor power supply apparatus in which a linear motor supply system is grouped into two systems in the case where a drive coil is arranged in two layers on a track. That is, drive coil units CX1, CX2, . . ., CXm are connected in series with each other to constitute a linear motor unit LMX1 belonging to an X-system, and coil units CY1, CY2, . . ., CYm are connected in series with each other to constitute a linear motor unit LMY1 belonging to a Y-system. The thus formed linear motor units LMX1, LMX2, LMX3 . . . belonging to the X-system are arranged in a row on a track and linear motor units LMY1, LMY2, LMY3 . . . belonging to the Y-system are arranged also in a row on the same track to form two layers of linear motor unit rows. Respective one ends of the linear motor units LMX1, LMX2, LMX3 . . . belonging to the X-system are alternately connected to feeders FXA and FXB of A- and B-groups, respectively, of the X-system, through corresponding feeder section switches SX1, SX2, SX3 . . . respectively. Similarly to this, respective ones of the linear motor units LMY1, LMY2, LMY3 . . . belonging to the Y-system are alternately connected to feeders FYA and FYB of A- and B-groups, respectively, of the Y-system, through corresponding feeder section switches SY1, SY2, SY3 . . . respectively. The feeders FXA and FXB of the X-system are connected to the respective outputs of power converters PCXA and PCXB of the X-system through switches SLXA and SLXB respectively and the feeders FYA and FYB of the Y-system are connected to the respective outputs of power converters PCYA and PCYB of the Y-system through switches SLYA and SLYB respectively. The respective other ends of the linear motor units of the X- and Y-systems are respectively connected to the respective return path feeders FNX and FNY of the X- and Y-systems. The respective power supply systems for the X- and Y-systems are basically similar to the power supply system of FIG. 1. Accordingly, it is meant that substantially two power supply systems of FIG. 1 are provided in this embodiment of FIG. 2.

In the thus arranged embodiment, the linear motor units LMX and LMY at which a vehicle exists are excited to drive the vehicle in such a manner that the feeder section switches SX1, SX2 . . . and the respective output side switches SLXA and SLXB of the power converters PCXA and PCXB of the X-system and the feeder section switches SY1, SY2 . . . and the respective output side switches SLYA and SLYB of the power converters PCYA and PCYB of the Y-system are successively turned on/off as the vehicle travels under the condition that the output side switches SLYA and SLYB of the power converters PCYA and PCYB are closed. The on/off operation of the respective feeder section switches, the respective output side switches of the power converters in each of the X- and Y-systems is performed by a switch control circuit SC in the same manner as disclosed in the above-mentioned U.S. Pat. No. 4,348,618.

FIG. 3 shows, in another embodiment, the arrangement of linear motor units in a linear motor power supply apparatus in which a drive coil is arranged in one layer on a track and the linear motor power supply system is divided into two. In this embodiment, a predetermined number of drive coil units C1, C2, . . ., Cm are disposed in one row and in one layer along the track. Alternate ones of these drive coil units are connected in series so as to form one linear motor unit LMX1 for one of the two power supply sytems, that is X-system, by the series connected C1, C3, . . ., Cm−1 and one linear motor unit LMY1 for the other power supply system, that is Y-system, by the series connected C2, C4, . . ., Cm. The thus formed linear motor units LMX1, LMX2, LMX3 . . . of the X-system and LMY1, LMY2, LMY3 . . . of the Y-system are connected to the power converters PCXA and PCXB of the X-system and the power converters PCYA and PCYB of the Y-system in the same manner as the embodiment of FIG. 2.

In each of the embodiments of FIGS. 2 and 3, the length of each linear motor unit is selected to be shorter than that of the vehicle.

Figure 4:
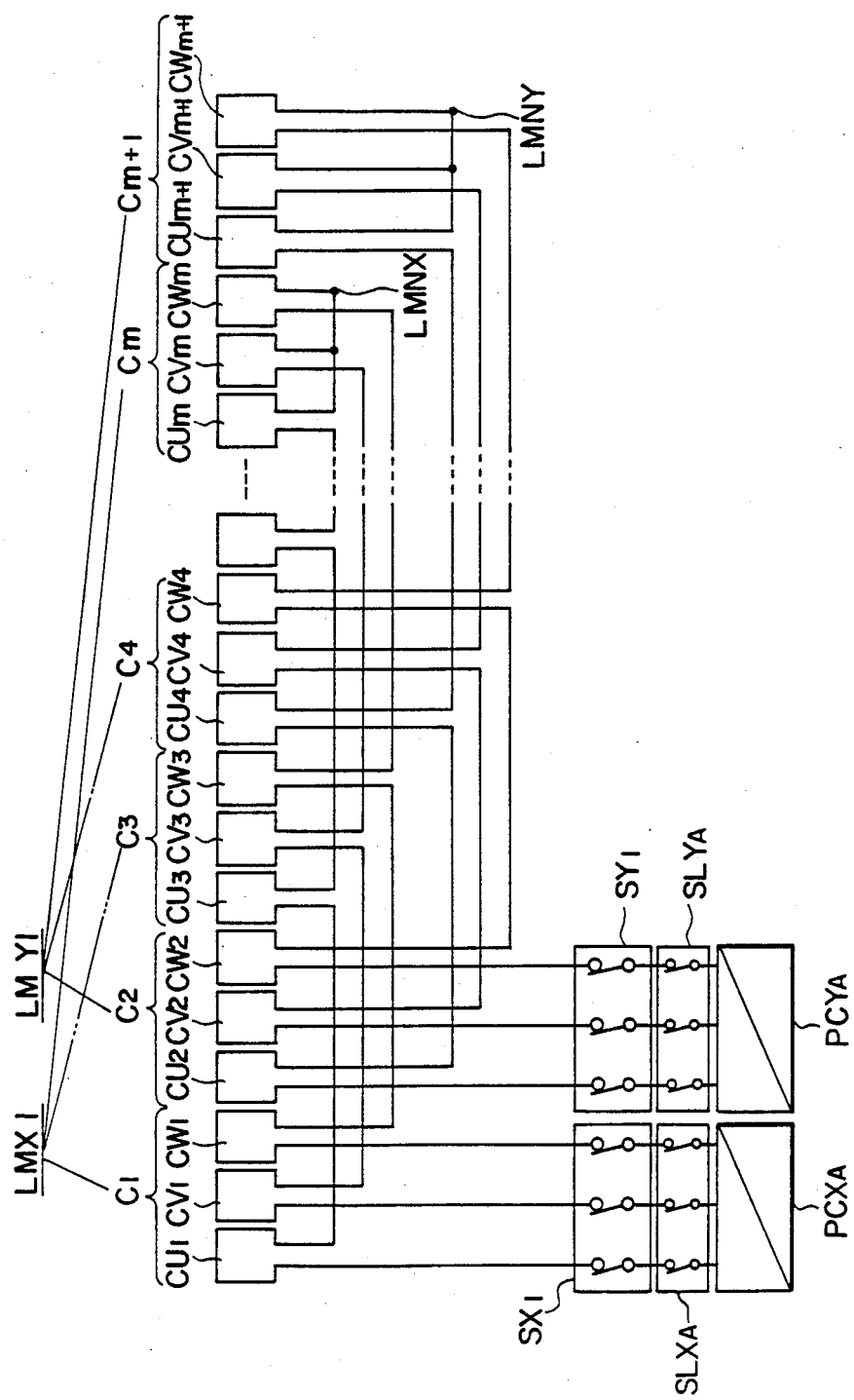
FIG. 4 is a circuit diagram showing the arrangement and connection of the propelling or drive coils of the linear motor units shown in FIG. 3.

In each of the embodiments of FIGS. 2 and 3, although the drive coil is illustrates as if it has a single phase for the purpose of simplicity of the drawings, it has three phases in an actual case. FIG. 4 shows the three phase connection of the drive coil of FIG. 3 which is composed of the linear motor units arranged in one layer. In FIG. 4, the respective drive coil units C1, C2, C3, . . ., Cm, Cm+1 are composed of three phase (that is U−, V−, and W−phase) components CU1, CV1, CW1; CU2, CV2, CW2; CU3, CV3, CW3; . . ., CUm, CVm, CWm; CUm+1, CVm+1, CWm+1, respectively, these drive coil unit three-phase components being arranged in one row along the track. Every phase components of the drive coil units in odd numbers C1, C3, C5, . . ., Cm are connected in series to form one linear motor unit LMX1 of X-system having a predetermined section length. One end of each phase of the linear motor unit LMX1 is connected to the power converter PCXA of the X-system through the feeder section switch SX1 and the power converter output side switch SLXA, while the other end of each phase of the same is connected to the neutral point LMNX of X-connection. Similarly to this, every phase components of the drive coil units in even numbers C2, C4, . . ., Cm+1 are connected in series to form one linear motor unit LMY1 of Y-system. One end of each phase of the linear motor unit LMY1 is connected to the power converter PCYA of the Y-system through the feeder section switch SY1 and the power converter output side switch SLYA, while the other end of each phase of the same is connected to the neutral point LMNY of Y-connection. In this manner, the respective drive coil units for the X- and Y-system are alternately successively disposed in one row.

In FIG. 4, since alternate ones of the drive coil units, that is C1, C3, C5 . . . ; and C2, C4 . . . , are connected in series (2:1 interlace connection), two power supply systems, that is X- and Y-system, are formed for the linear motor units. However, if every third ones of the drive coil units, that is C1, C4, C7 (not shown) . . . ; C2, C5 (not shown), C8 (not shown) . . . ; C3, C6 (not shown), C9 (not shown) . . . , are connected in series (3:1 interlace connection), three power supply systems can be formed. Accordingly, in general, if every N-th ones (N being an integer not smaller than 2) of the drive coils are connected in series (N:1 interlace connection), N power supply systems can be formed.

Figure 5A:
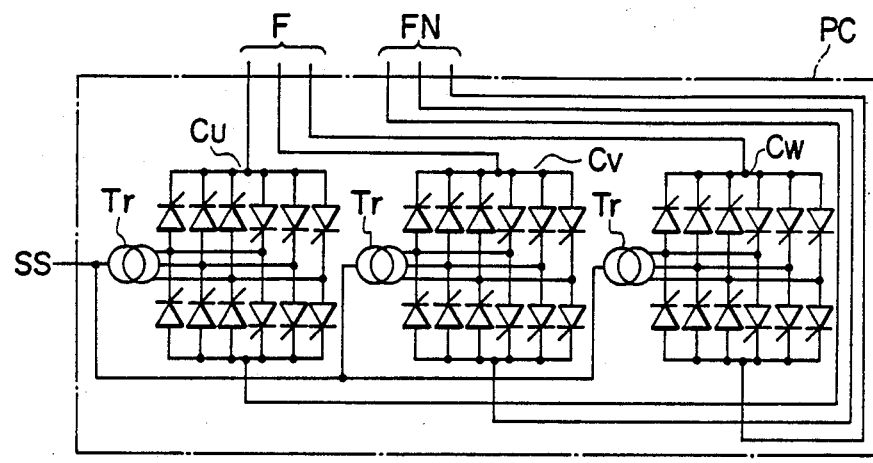
FIGS. 5A and 5B show the circuit arrangement of a power converter which can be employed in the power supply apparatus in the embodiments according to the present invention.

FIG. 5A is a circuit diagram showing an exemplary arrangement of the three-phase power converter or the three-phase power system of FIG. 4. The power converter circuit shown in FIG. 5A is composed of a three-phase cyclo-converter constituted by three single-phase cyclo-converters CU, CV, and CW. The power converter circuit has one output terminals to be connected to feeders F and the other terminals to be connected to feeders FN, to thereby form the power supply source circuit for the three-phase linear motor. The reference marks Ir and SS designate a transformer and a power receiving point respectively.

Figure 5B:
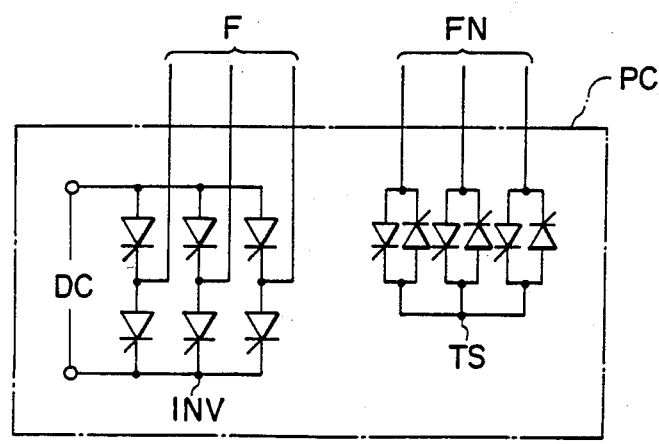

In contrast to FIG. 5A, FIG. 5B shows an exemplary power supply converter circuit in which a conventional three-phase invertor INV having no neutral point is employed as a power converter. In this case, it is required to provide a thyristor switch circuit TS which can be turned on and off in synchronism with the activation and deactivation, respectively, of the three-phase invertor INV for the purpose of providing a neutral point for the three drive coil units.

The basic operation of the thus arranged linear motor power supply apparatus (for example, the apparatus of FIG. 2 is assumed here) will be described hereunder by using the time chart of FIG. 6. The operations of the feeding section switches and the output side switches, which will be explained later, are attained in response to the instructions by a switch control circuit SC. Assume now that all the power converters PCXA, PCXB, PCYA, and PCYB operate normally, all the switches SLXA, SLXB, SLYA, and SLYB are closed, and all the power converters are connected to the feeders FXA, FXB, FYA, and FYB.

Figure 6:
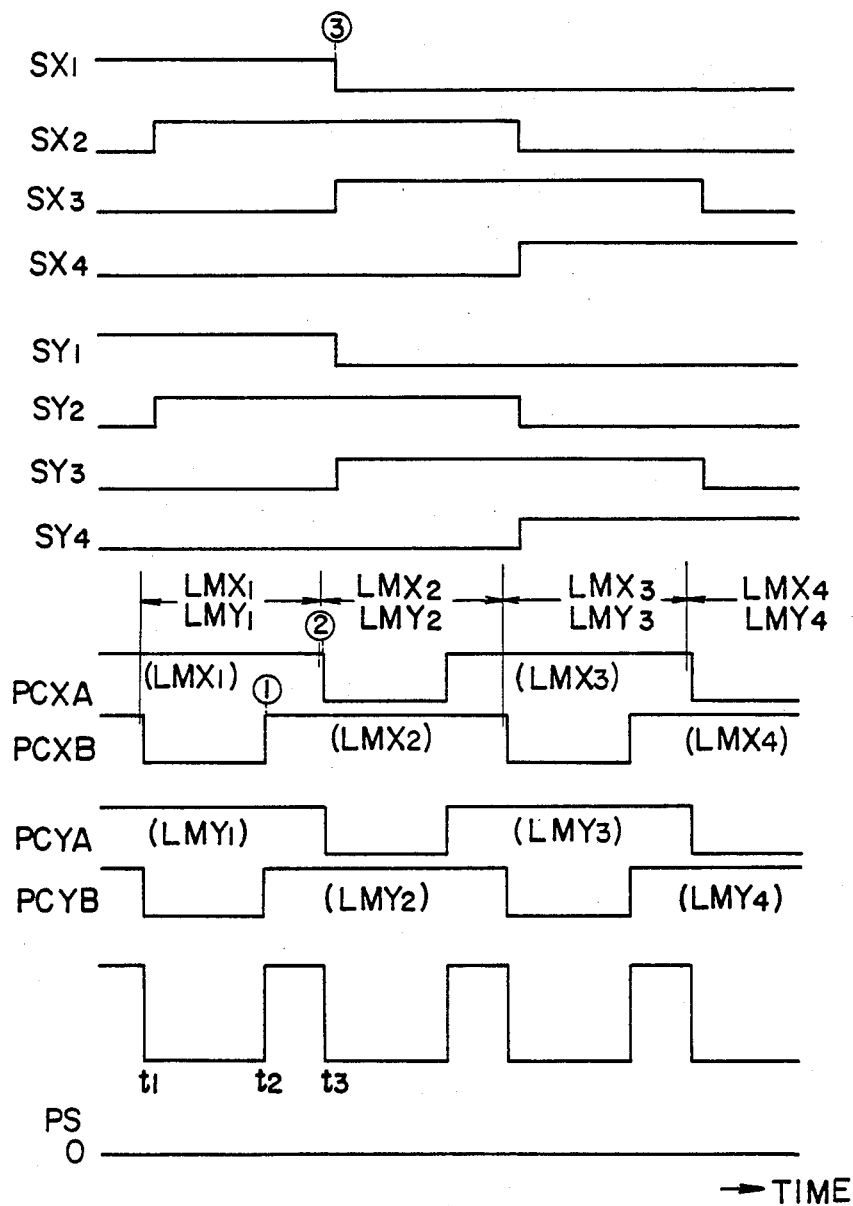
FIG. 6 is a time chart for explaining the operation of each power supply apparatus of FIGS. 2 and 3.

In FIG. 6, in each of the respective waveforms of the feeder section switches SX1, . . . , SX4, SY1, . . . , SY4, a high and a low level mean that a switch is in its closed and opened state respectively. In each of the respective waveforms of the power converters PCXA, PCXB, PCYA, and PCYB, a high level means that a power converter is in its "activated state", that is a state in which a linear motor unit is energized, while a low level means that the linear motor unit is deenergized. The reference mark put at each high level portion designate the linear motor unit which is energized at that time from the designated power converter.

Assuming now the vehicle TR is located at the linear motor units LMX1 and LMY1 as shown in FIG. 2, the feeder section switches SX1 and SY1 are in their closed state and the linear motor units LMX1 and LMY1 are being excited by the power converters PCXA and PCYA of the corresponding groups respectively so that the vehicle is travelling. Under the condition, the feeding section switches SX2 and SY2 of the linear motor units LMX2 and LMY2, respectively, of the forward group B into which the vehicle the vehicle comes next were already closed and the power converters PCXB and PCYB connected to these feeding section switches have stopped their power supply. When the vehicle reaches a position immediately before the linear motor units LMX2 and LMY2, the power converters PCXB and PCYB which have been in the standby state initiate their power supply to cause a current to flow into each of the linear motor units LMX2 and LMY2 (at the time (1) in FIG. 6). Thus, the linear motor units at which the vehicle is now travelling and the linear motor units into which the vehicle will come next are successively continuously energized so that the vehicle is given continuous propelling or driving force to be enabled to smoothly come into succeeding new linear motor units. When the vehicle has come into the succeeding linear motor units LMX2 and LMY2, the linear motor units LMX2 and LMY2, which do not no longer need excitation, are deenergized (at the time (2) in FIG. 6). Thereafter, the feeder section switches SX1 and SY2 respectively connected to the linear motor units LMX1 and LMY1 are opened with no current flowing therethrough, and at the same time the feeder section switches SX3 and SY3 respectively associated with the linear motor units LMX3 and LMY3 into which the vehicle will come next are closed so as to prepare the linear motor units LMX3 and LMY3 for their coming excitation (at the time (3) in FIG. 6). This is to be repeated in the following so that the feeder section switches are successively switched over as the vehicle advances such that the linear motor units are continuously successively energized by the associated power converters such that the linear motor units at which the vehicle exists are excited to drive the vehicle.

In the case the linear motor power supply apparatus is normal, the power converters and the various switches operate in the manner as described above. On the contrary, in case a failure occurs in either one or both the power converters PCXA and PCXB of one of the power supply system, for example the X-system, the switches SLXA and SLXB are opened to cut off the power supply system to which the defective power converter/converters belong, that is the X-system in this assumption, from the associated feeders, and the power converters of the normal power supply system Y are operated in the same manner as FIG. 6. Thus, the linear motor units LMY1, LMY2 . . . of the Y-system are successively excited in the same manner as the normal case in accordance with the movement of the vehicle. Accordingly, although the maximum propelling or driving force for the vehicle is reduced by half in comparison with that in the normal case, the vehicle is not supplied with intermittent propelling or driving force unlike the case of FIG. 1 so that there is no risk of deterioration of ride comfort so that the vehicle can be moved in a stable condition.

Further, in case one of the power converters of the X-system, for example PCXA, as well as one of the power converters of the Y-system, for example PCYB, get out of order, the switches SLXA and SLYB at the outside of the respective defective power converters PCXA and PCYB are opened to cut off the power converters PCXA and PCYB from the associated feeders. Thus, the remained normal power converters PCXB and PCYA are respectively connected to the associated feeders FXB and FYA and the switches SY1, SX2, SY3 . . . are successively closed to thereby successively excite the linear motor units LMY1, LMX2, LMY3 . . . so that the vehicle is supplied with continuous propelling or driving force so as to travel in the stable condition similarly to the previous case. In this case, however, the propelling or driving force is reduced by half in comparison with the normal case.

Further, even in case of a failure in feeder such as shortcircuit, ground fault, disconnection, or the like, a failure in feeder section switch such as lack of ability of closing/opening, a failure in drive coil such as shortcircuit, ground fault, disconnection, or the like, if the failure occurs in either one of the two power supply systems, it is possible to cause the vehicle to run by means of the other power supply system.

Furthermore, even in case the respective power supply circuits of the A-group of one of the power supply systems and the B-group of the other power supply system, it is possible to cause the vehicle to run in the stable condition through the remaining power supply circuits.

Further, even in case where the power supply circuits of the three among the four groups get out of order, if the remaining one power supply circuit is normal, an emergency operation can be performed although only intermittent propelling or driving force is applied to the vehicle.

The power supply apparatus according to the present invention can be applied into such a case where the groups of each power supply system are increased in number to be three or more, the power supply systems are increased in number to be three or more. In such a case, it is a matter of course that the reliability can be improved in running of the vehicle although the arrangement becomes complicated.

Thus, the present invention has an advantage that the running operation of the vehicle can be remarkably improved in reliability.

Further, the power supply apparatus according to the present invention is advantageous, as will be described later, in that the degree of freedom in design of system hardware is high so that optimum design can be attained for a linear motor power supply apparatus of a large capacity for use such as a magnetically floating railway. That is, in FIG. 3, the terminal voltage V of each drive coil unit is expressed in a following equation as follows:

$$V = \sqrt{(RI + E)^2 + (XI)^2}$$

where I represents a current flowing through the linear motor unit, E a voltage induced in the drive coil, X a reactance of the drive coil, and R a resistance of the drive coil.

On the contrary, in the conventional case of FIG. 1, all the drive coil units are connected in series without interlacing adjacent ones of the drive coil units, so that the serially connected drive coil units in one linear motor unit is two times in number as large as that of the case of FIG. 3 (then it is assumed that the length of the linear motor unit is equal to each other between the respective cases of FIGS. 1 and 3. Accordingly, the value of each of E, R, and X in FIG. 1 is two times as large as those in FIG. 3, so that the terminal voltage V is also double. This means that if it is assumed the drive coil has the same dielectric strength between the respective cases of FIGS. 1 and 3, in order to excite the drive coil unit with the same terminal voltage between the respective cases of FIGS. 1 and 2, the number of turns of the drive coil unit of FIG. 3 may be increased in comparison with the that of FIG. 1 to increase the induce voltage E (reactance X also increases) so that the current I can be reduced correspondingly in comparison with FIG. 1 (since the electric output of motor which is in proportion to EXI is made equal). Specifically, in the case where the cross-sectional area of the coil unit is reduced by half and a half current is caused to flow through the coil unit in FIG. 3 so that the current density in the drive coil unit is equal between the respective cases of FIGS. 1 and 3, it is sufficient to make the number of turns of the drive coil unit double in FIG. 3 in comparison with that in FIG. 1 in order to make the terminal voltage of the linear motor unit in FIG. 3 equal to that in FIG. 1.

Accordingly, in the embodiment of FIG. 3, there is a remarkable advantage in producing hardwares in that the thickness of wire for drive coil units and feeders can be reduced in comparison with the conventional case of FIG. 1. In a particularly large capacity linear motor, there is a limit in the level of terminal voltage in view of dielectric strength so that the current flowing through the drive coil unit becomes large to an order of several thousand amperes. Accordingly, the advantage of this embodiment is excellent in that design can be made so as to reduce the current passing through the drive coil unit.

Figure 7:
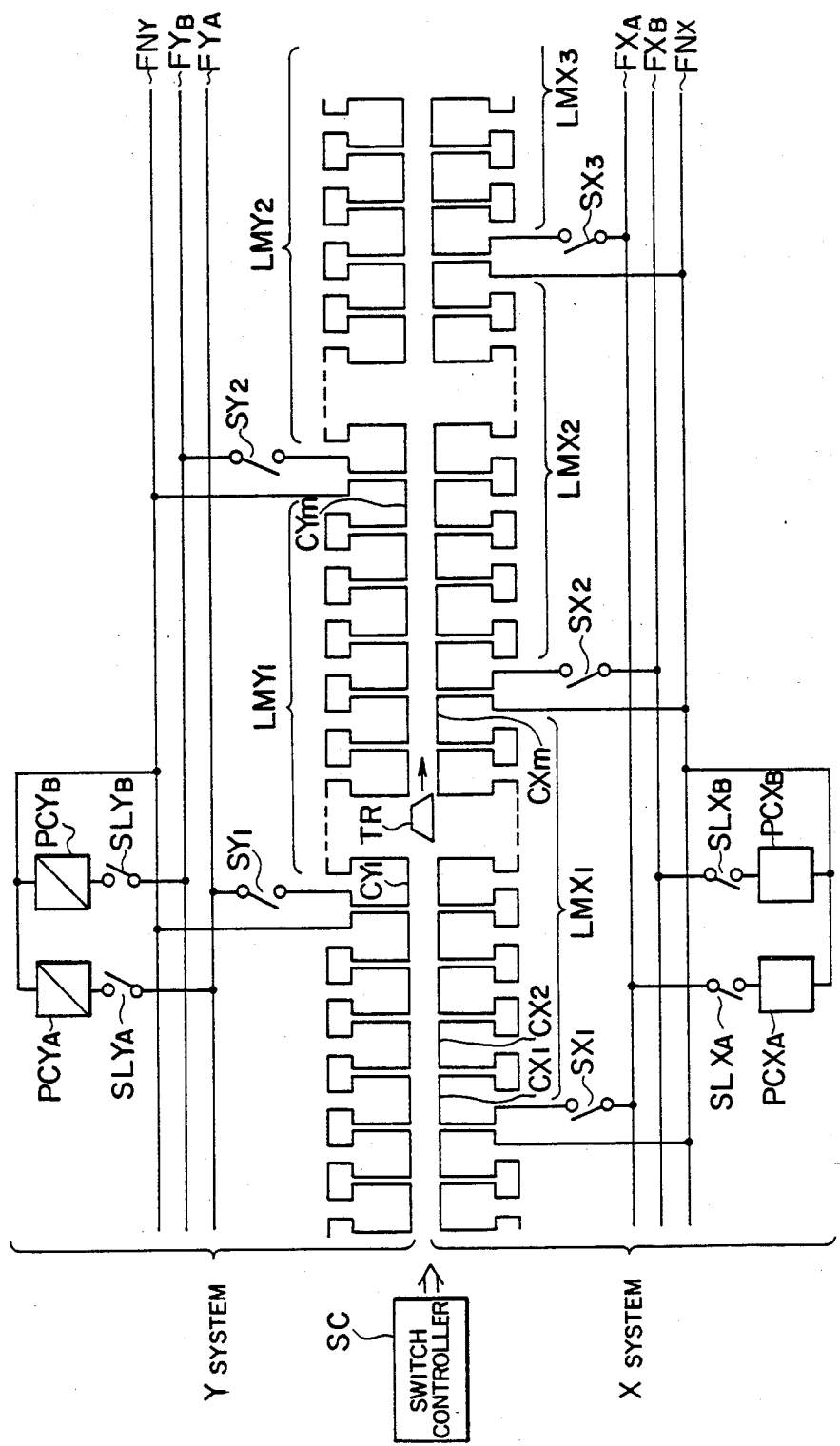
FIG. 7 is a circuit diagram showing another embodiment according to the present invention.

FIG. 7 shows a modification of the power supply apparatus of FIG. 2 which is different from the FIG. 2 embodiment in that the linear motor units LMY1, LMY2, LMY3 . . . of the Y-system are offset from the respective linear motor units LMX1, LMX2, LMX3 . . . of the X-system by the length of vehicle or more as shown in the drawing (about half of the length of linear motor unit in the drawing). The linear motor units, the feeder section swtiches, the feeders and the power converters are interconnected in the same manner as the FIG. 2 embodiment.

Figure 8:
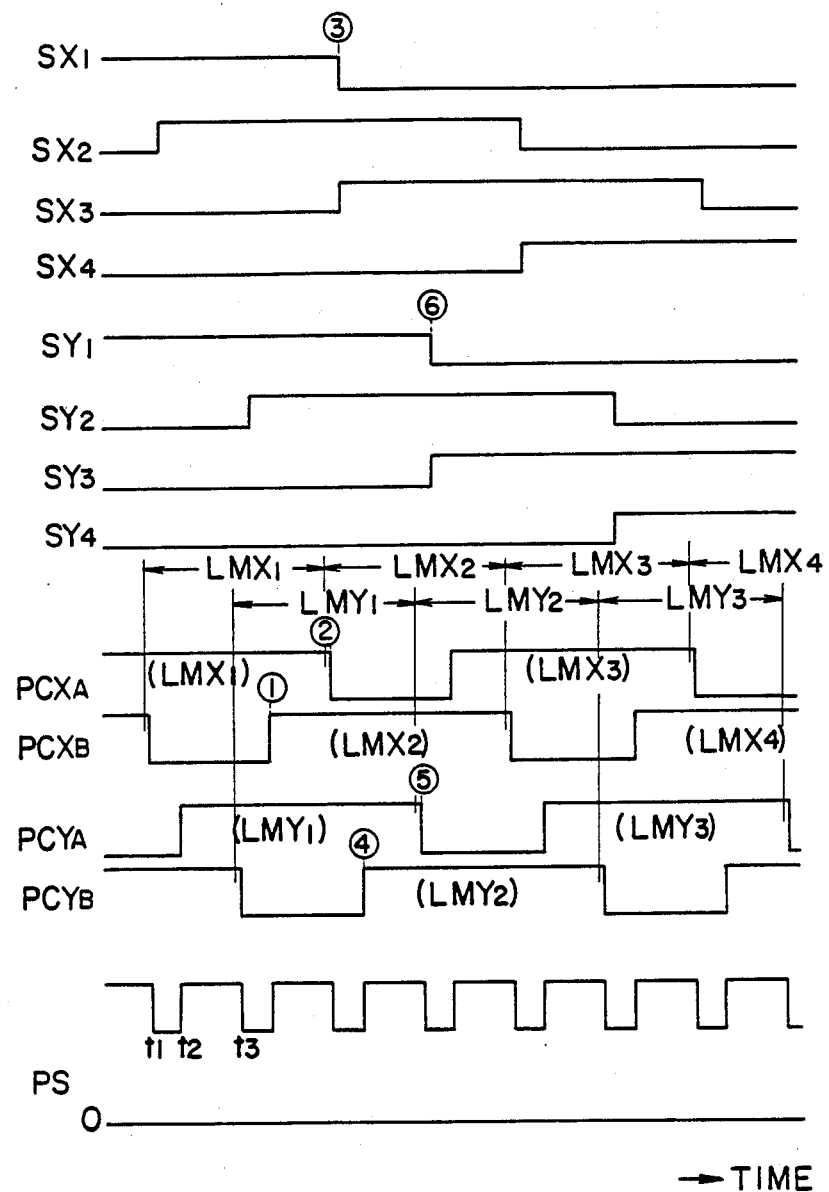
FIG. 8 is a time chart for explaining the operation of the embodiment of FIG. 7.

Referring to the operation chart of FIG. 8, the operation of the linear motor power supply apparatus of FIG. 7 will be described hereunder. When the vehicle TR exists in a position as shown in FIG. 7, the linear motor units LMX1 and LMY1 below the vehicle are being excited by the power converters PCXA and PCYA respectively. The feeder section switch SX2 for the linear motor unit LMX2 into which the vehicle is going to enter has been already closed, while the power converter PCXB is in the power supply stopping state. When the vehicle comes a position immediately before it enters the linear motor unit LMX2 (at the time ① in FIG. 8), the power converter PCXB is energized to start the excitation of the linear motor unit LMX2. When the vehicle further advances to come out of the linear motor unit LMX1, the power converter PCXA is deenergized to stop its power supply operation (at the time ② in FIG. 8). Thereafter the feeder section switch SX1 which is in the state no current is flowing therethrough is opened and at the same time the feeder section switch SX3 in the forward direction with respect to the movement of the vehicle is closed to set it in the stand-by state (at the time ③ in FIG. 8). When the vehicle further advances to come to a position immediately before it enters the liner motor unit LMY2 of the B-group in the Y-system, the power converter PCYB is energized to start the excitation of the linear motor unit LMY2 (at the time ④ in FIG. 8). When the vehicle has come out of the linear motor unit LMY1, the power converter PCYA is deenergized (at the time ⑤ in FIG. 8), and the switch SY1 through which no current is now flowing is opened while at the same time the switch SY3 located forward is closed (at the time ⑥ in FIG. 8). This is to be repeated in the following so that the feeder section switches are successively switched over as the vehicle advances and the linear motor units at which the vehicle exists are excited, to thereby drive the vehicle. As seen in FIG. 8, the operations of the power converters PCXA and PCXB of the X-system offset in operation time from the operations of the power converters PCYA and PCYB of the Y-system by the amount corresponding to the physical offset amount of linear motor between the X- and Y-systems. Accordingly, the variations of the sum PS of apparent power at the source sides of the four power converters (although, properly, the power of the four power converters must be vector-composed, the sum PS is expressed by a scalar quantity for the sake of simplicity) are reduced about by half in comparison with the variations (PS in FIG. 6) in the embodiment of FIG. 2. That is, in the FIG. 2 embodiment, as shown in FIG. 6, two power converters operate in the period of time from t1 to t2 and four power converters operate in the period of time from t2 to t3, so that the ratio of the sum PS of apparent power between the two period is 1:2. On the contrary, in the FIG. 7 embodiment, as shown in FIG. 8, two power converters operate in the period of time from t1 to t2 and three power converters operate in the period of time from t2 to t3, so that the ratio of the sum PS of apparent power between the two period is 2:3. Accordingly, the variations in PS in the FIG. 7 embodiment is reduced about by half in comparison with the FIG. 2 embodiment.

Thus, in the embodiment of FIG. 7, there is an advantage that the power variations in the source side of the power converters are reduced in addition to the advantage that is obtained in the embodiment of FIG. 2.

Similarly to this, also in the embodiment of FIG. 3, the linear motor units may be offset from each other between corresponding groups in the respective X- and Y-systems, thereby obtaining the same effect as in the FIG. 7 embodiment.

Figure 9:
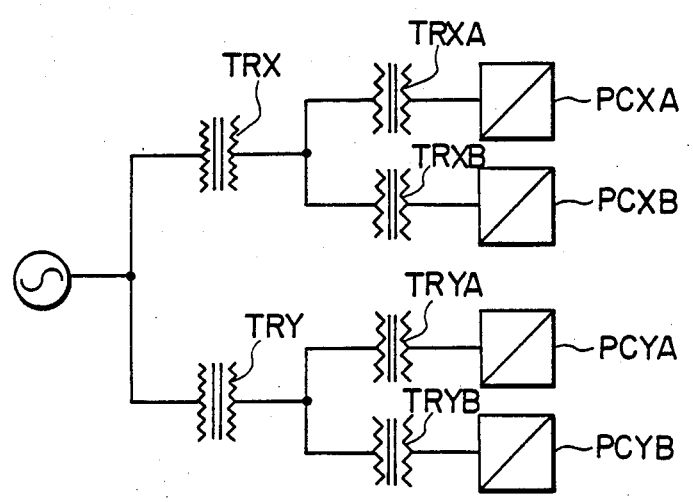
FIG. 9 is a diagram showing the circuit at the AC source side of the power converters in each embodiment according to the present invention.

FIG. 9 shows the connections at the AC source side of the respective power converters. This embodiment is an arrangement of two power supply system each including two groups similarly to the embodiments of FIGS. 2, 3 and 7. Power converters PCXA and PCXB of the X-system are connected through respective power receiving transformers TRXA and TRXB to the secondary side of a power receiving transformer TRX commonly provided for the A- and B-groups, and power converters PCYA and PCYB of the Y-system are connected through respective power receiving transformers TRYA and TRYB to the secondary side of a power receiving transformer TRY commonly provided for the A- and B-groups. The respective primary sides of the transformers TRX and TRY are connected to an AC source.

There is an advantage that the thermal capacity of each power receiving transformer can be somewhat reduced because the power receiving transformers are separately provided for the X- and Y-systems.

Figure 10:
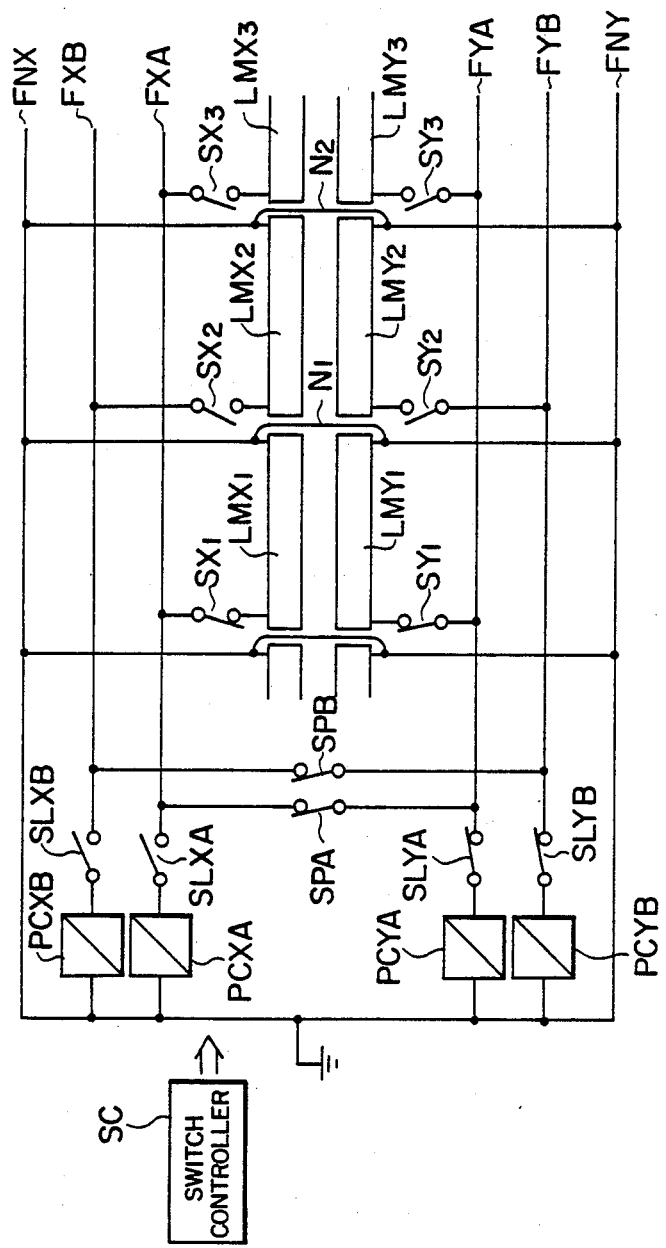
FIGS. 10 to 13 are circuit diagrams of various embodiment according to present invention.

FIG. 10 shows another embodiment which is a modification of the embodiment of FIG. 2 or 3.

In FIG. 10, linear motor units LMX and LMY corresponding to those in the embodiment of FIGS. 2 or 3 are shown in blocks. In comparison with the embodiment of FIGS. 2 or 3, parallel connection switches SPA and SPB for connecting feeders of the corresponding A-groups of the respective X- and Y-systems and for connecting feeders of the corresponding B-groups of the respective X- and Y-systems, respectively, are additionally provided in this embodiment of FIG. 10. That is, the feeder FXA of the A-group in the X-system and the feeder FYA of the A-group in the Y-system are connected to each other the switch SPA and the feeder FXB of the B-group in the Y-system and the feeder FYB of the B-group in the Y-system are connected to each other through the switch SPB. Further, the respective neutral points of the linear motor units of the corresponding groups of the X- and Y-systems, that is for example the respective neutral points of the linear motor units LMX1 and LMY1, are connected to each other through a jumper wire N1. This jumper wire is not always necessary.

The operation of the embodiment of FIG. 10 will be described hereunder.

In FIG. 10, when the respective power supply systems are normal, the switches SPA and SPB are opened and the output side switches SLXA, SLXB, SLYA, and SLYB of the respective power converters are closed to operate in the same manner as in the case of FIG. 2.

In case the power converters PCXA and PCXB get out of order, the output side switches SLXA and SLXB thereof are opened and the switches SPA and SPB are closed (the state shown in FIG. 10). Under the condition, the feeder section switches and the power converters PCYA and PCYB are actuated to operate in the same manner as in the FIG. 2 (FIG. 6). Thus, the linear motor units of the X-system with the associated power converters failured are connected with the power converters of the Y-system in parallel with the linear motor units of the Y-system so as to be excited by the power converters of the Y-system which are in the normal condition. Accordingly, it is possible to give smoother propelling or driving force to the vehicle in comparison with the case where only the linear motor units of the Y-system are excited by the normal power converters of the Y-system.

Similarly to this, if the power converters of the Y-system get out of order, on the other hand, the linear motor units of both the X- and Y-systems are parallelly excited by the power converters of the X-system which are in the normal condition. Even in the emergency case where the power converter/converters of one of the X- and Y-systems and the linear motor/motors of the other system get out of order, it is possible to operate the vehicle by exciting the linear motor units of the one system by the power converters of the other system. That is, for example, when the power converters of the Y-system and the linear motor units of the Y-system get out of order, the switches SPA and SPB are opened, and all the feeder section switches SY1, SY2, SY3 . . . of the Y-system and the output sde switches SLXA and SLXB of the X-system are opened, so that the linear motor units of the X-system are excited from the power converters PCYA and PCYB of the Y-system through the switches SPA and SPB to give continuous propelling or driving force to the vehicle to thereby stably drive the vehicle.

Figure 11:
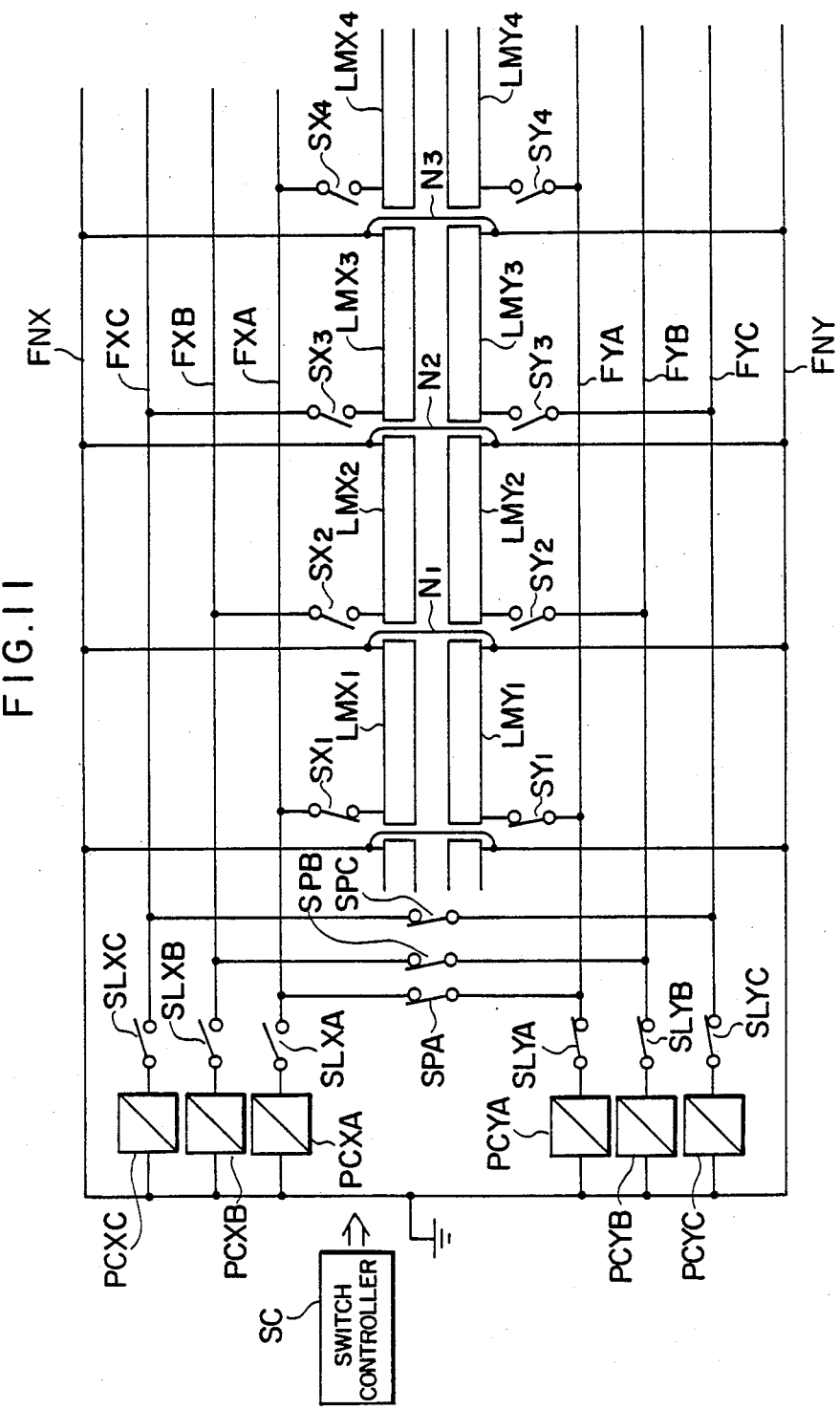

FIG. 11 is an embodiment which is a modification of the FIG. 10 embodiment in which the linear motor units of each power supply system is grouped into three, that is A-, B- and C-groups.

Accordingly, in this embodiment, there are additionally provided, in comparison with the embodiment of FIG. 10, power converters PCXC and PCYC for supplying power to the linear motor units of the C-group in the respective X- and Y-system, output side switches SLXC and SLYC of the power converters PCXC and PCYC of the respective X- and Y-systems, feeders FXC and FYC connected with the output side switches in the respective X- and Y-systems, feeder section switches SX3 and SY3 for connecting the linear motor units LMX3 and LMY3 with the feeders FXC and FYC in the respective X- and Y-systems, and a switch SPC for connecting the feeders FXC and FYC of the respective X- and Y-systems with each other.

In this embodiment, since the groups of the linear motor units are large in number, the effects of the embodiment of FIG. 10 can be obtained with higher reliability.

Figure 12:
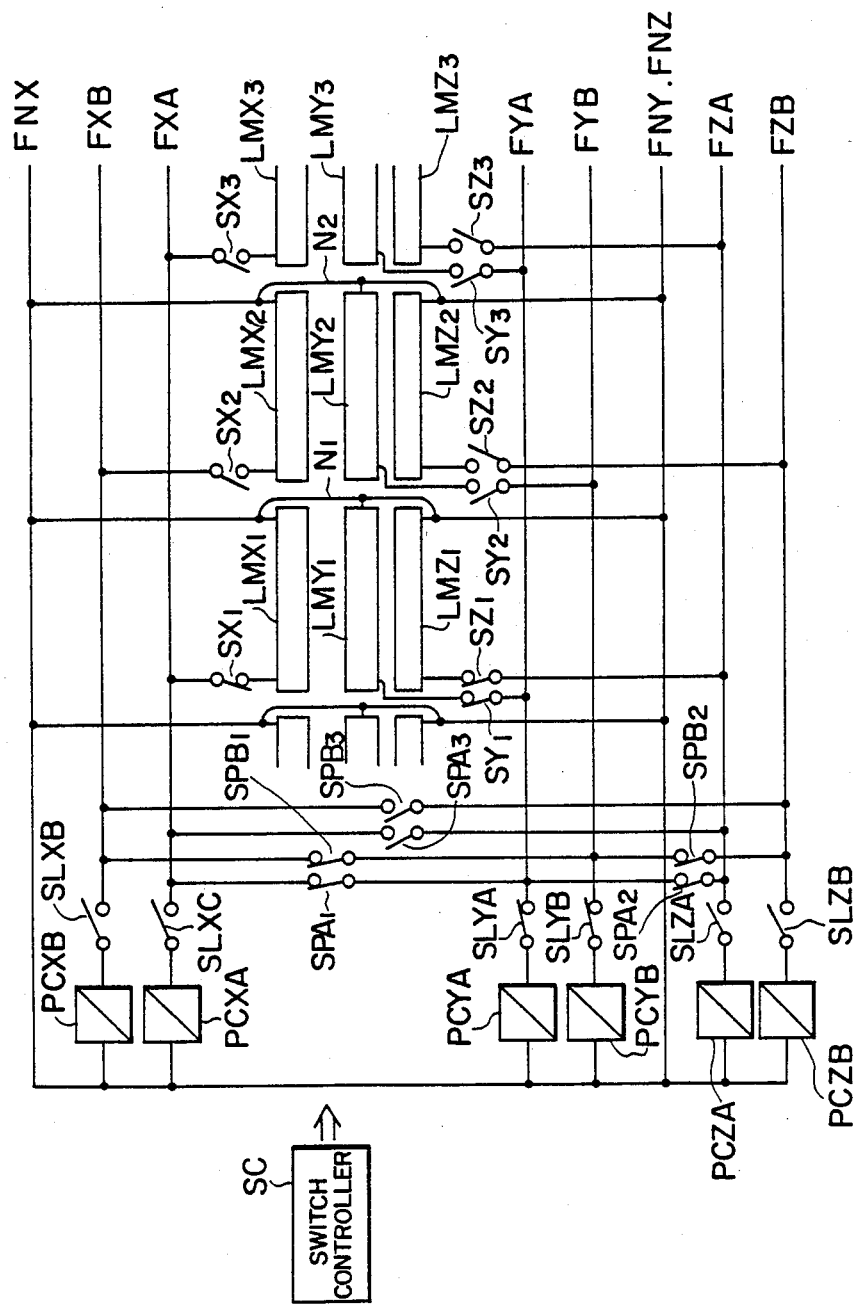

FIG. 12 shows a further embodiment which is a modification of the embodiment of FIG. 10 and in which a further power supply system, that is a Z-system, is added. That is, in the FIG. 12 embodiment, for the Z-system there are additionally provided power converters PCZA and PCZB, output side switches SLZA and SLZB of the power converters, feeders FZA and FZB connected with the output side switches, linear motor units LMZ1, LMZ2, LMZ3 . . . , feeder section switches SZ1, SZ2, SZ3 . . . for connecting the linear motor units with the feeders FZA and FZB. The arrangement further comprises parallel connection switches SPA2 and SPA3 for connecting the feeder FZA with the respective feeders FXA and FYA of the X- and Y-systems and parallel connection switches SPB2 and SPB3 for connecting the feeder FZB with the respective feeders FXB and FYB of the X- and Y-systems, the respective neutral points of the linear motor units of the corresponding group of the respective X-, Y-, and Z-systems are connected to each other through jumper wires N1, N2, N3 . . .

Since there are provided three power supply systems, even if the respective power converters of any two systems, for example the X- and Z-systems, get out of order, the linear motor units of all the X-, Y-, and Z-systems can be driven by the remainder one system, for example Y-system, by setting the respective output side switches and the parallel connection switches in such a manner as shown in the drawing, resulting in improving in reliability of the apparatus. Further, linear motor units of at least one system can be excited by the power converter of at least one system.

Figure 13:
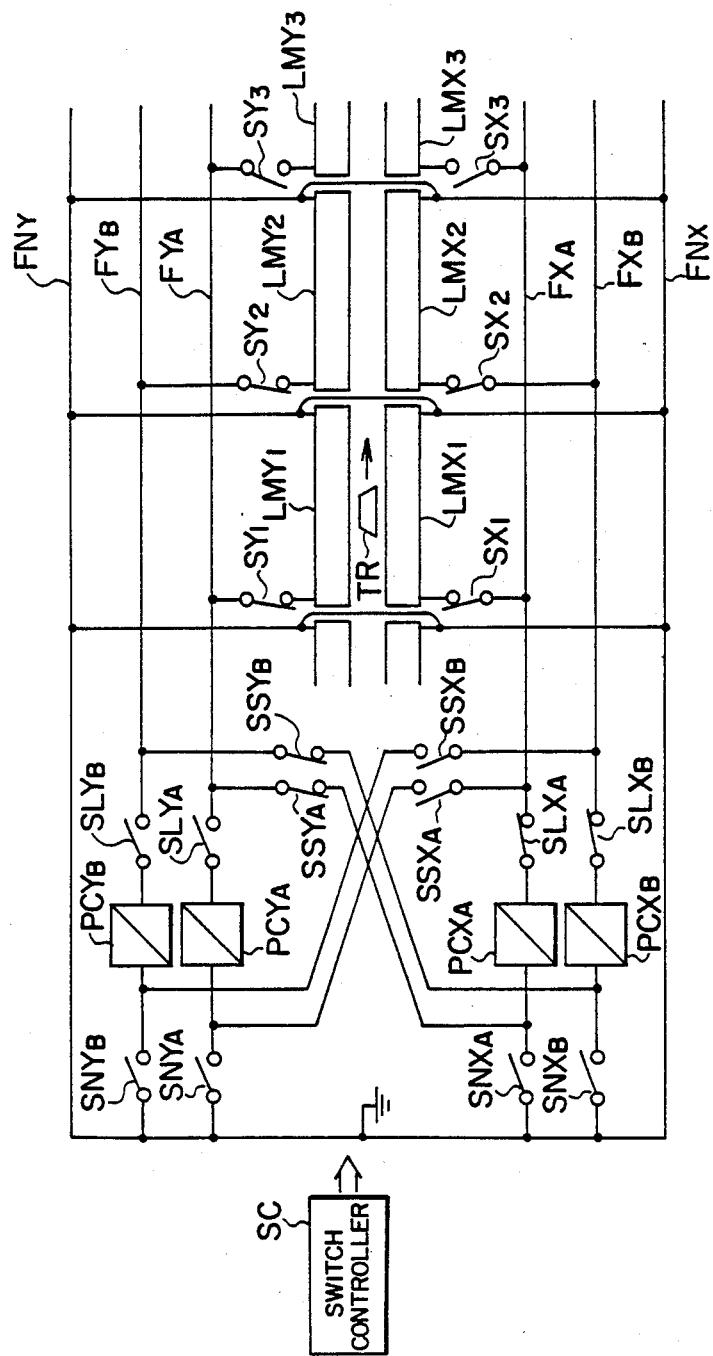

FIG. 13 shows another embodiment in which, in a power supply apparatus provided with linear motor units of two systems, there are additionally provided switches for connecting the linear motor units of the corresponding groups in series with each other. That is, the linear motor units of the corresponding groups of both the systems are excited in series with each other by the power converters of one of the two systems.

That is, in the embodiment of FIGS. 2 or 3, output side switches SLXA, SLXB, SLYA, and SLYB are respectively provided between the respective output sides of the power converters PCXA, PCXB, PCYA, and PCYB of the respective systems and the corresponding feeders FXA, FXB, FYA, and FYB, and return path side switches SNXA, SNXB, SNYA, and SNYB are respectively provided between the return sides of the respective power converters PCXA, PCXB, PCYA, and PCYB and the corresponding return path feeders FNX and FNY. Further, serial excitation change-over switches SSXA, SSXB, SSYA, and SSYB are provided between the respective feeder sides of the output side switches SLXA, SLXB, SLYA, and SLYB and the respective return path sides of the power converters PCYA, PCYB, PCXA, and PCXB of the corresponding groups of different system. The respective neutral points of the linear motor units of the corresponding groups in each system are connected with each other.

If both the X- and Y-systems are in the normal state, all the serial excitation switches are opened, and all the output side and return path side switches of the power converters are closed, so that the linear motor units are separately excited by the power converters of the X- and Y-systems respectively.

Figure 14A:
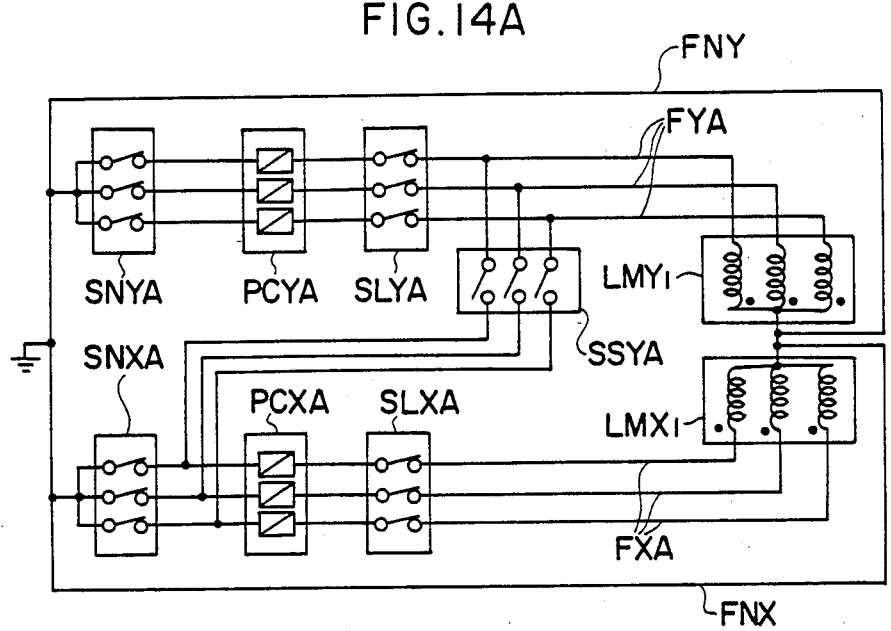
FIGS. 14A and 14B show detailed circuit arrangements when the power converters in FIG. 13 embodiment are normal and get out of order respectively.
Figure 14B:
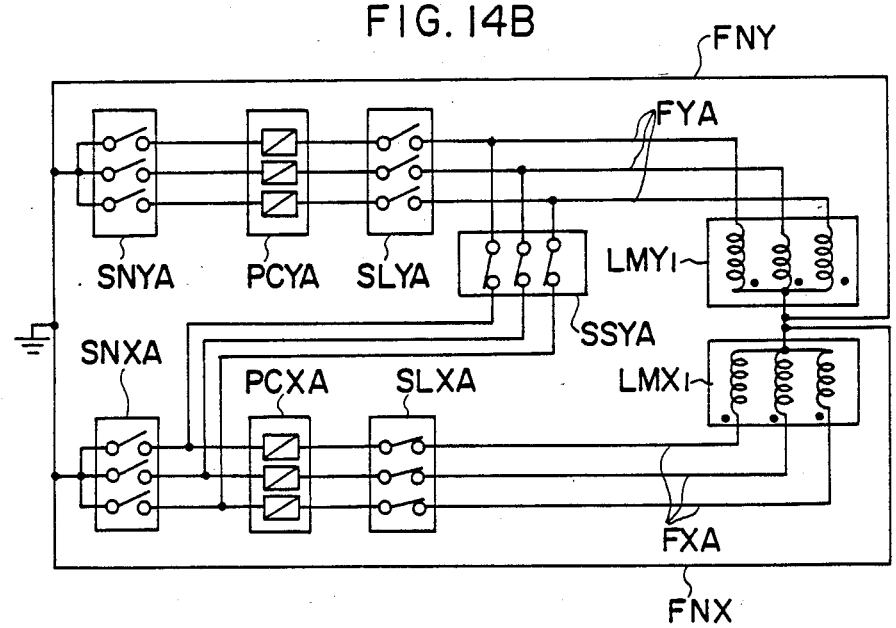

FIGS. 14A and 14B are diagrams each showing, with three-phase connection, the state of the respective switches when one set of linear motor units LMX1 and LMY1 are energized in FIG. 13. FIG. 14 shows the state in which the circuits of the X- and Y-systems are normal. That is, when both the circuits of the X- and Y-systems are normal, the switch SSYA is opened and the linear motor unit LMY1 of the A-group of the Y-system is excited by the power converter PCYA.

In the case where the power converter/converters of one system get out of order, while the linear motor units, the feeder section switches, the feeders, etc., are normal, the switches are set as shown in FIG. 13 so that the linear motor units of both the X- and Y-systems are serially excited by the power converters of the other system. For example, when the power converter PCYA of the B-group of the Y-system, the return path side switches SNXA, SNXB, SNYA, and SNYB of the respective power converters are opened, the output side switches SLYA and SLYB of the defective power converter PCYA and the other power converter PCYB of the same system are opened, and the switches SSYA and SSYB are closed. Thus, the normal power converter PCXA, the switch SLXA, the feeder FXA, the feeder section switch SX1, the linear motor units LMX1 and LMY1, the feeder section switch SY1, the feeder FYA, and the switch SSYA constitute a power supply circuit, so that the linear motor units LMX1 and LMY1 are serially excited by the power converter PCXA. FIG. 14B shows the state at this time. Similarly to this, the linear motor units LMX2 and LMY2 are serially excited by the normal power converter PCXB through the switch SSYB.

It should be noted that the linear motor units of the corresponding groups of the X- and Y-systems are connected with each other in opposite polarity. That is, in FIG. 14B, the currents flowing through the respective linear motor units LMX1 and LMY1 of the corresponding groups are opposite to each other with respect to the neutral point, and therefore it is necessary to make the polarity of the drive coil of the linear motor unit LMY1 in opposition to that of the linear motor unit LMX1 in order to obtain propelling or driving force in the same direction.

Since the linear motor units LMX1 and LMY2 are connected in opposite polarity to each other, the power converter of the Y-system is caused to operate with its output polarity opposed to that of the power converter of the X-system, under that normal condition.

Figure 15:
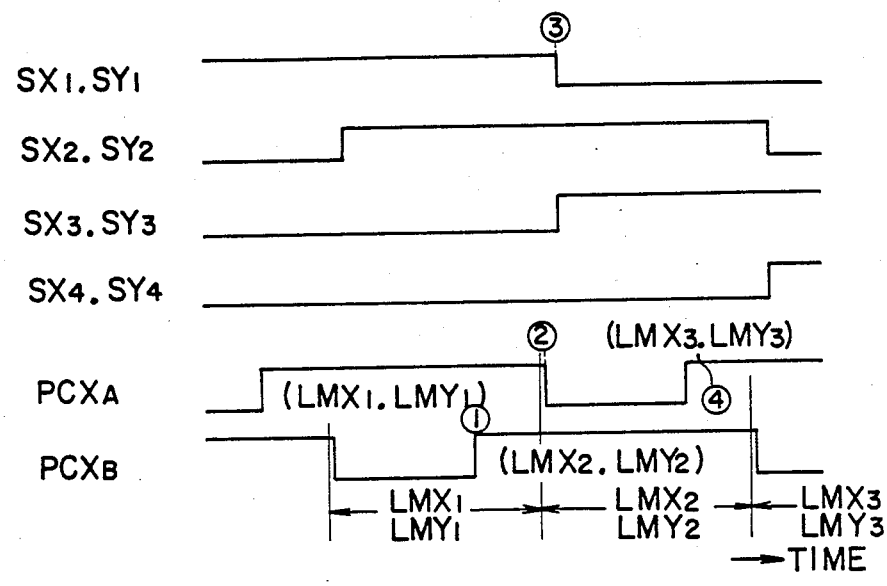
FIG. 15 is a time chart for explaining the operation of the embodiment of FIG. 13.

Referring to the time chart of FIG. 15, description will be made as to the operation of the power supply apparatus of FIG. 13 in the case where the power converter/converters of the Y-system becomes defective, as described above. When the vehicle exists at the linear motor units LMX1 as well as LMY1, the feeder section switches SX1 and SY1 are closed and the linear motor units LMX1 and LMY1 are serially excited by the power converter PCXA. When the vehicle advances to reach a position immediately before the forward linear motor units LMX2 and LMY2, the power converter PLXB is energized (at the time ① in FIG. 15) so as to serially excite the linear motor units LMX2 and LMY2 through the feeder section switches SX2 and SY2 which have been closed. If the vehicle further advances and has come out of the linear motor units LMX1 and LMY1, the power converter PCXA which has been supplying power stops the power supply operation (at the time ② in FIG. 15). Then, the feeder section switches SX1 and SY1 are opened with no current flowing therethrough, and at the same time the feeder section switches SX3 and SY3 of the forward linear motor units LMX3 and LMY3 to which the vehicle will enter next are closed (at the time ③ in FIG. 15). When the vehicle reaches a position immediately before the linear motor units LMX3 and LMY3, the power converter PCXA is energized to start the excitation of the linear motor units LMX3 and LMY3 (at the time ④ in FIG. 15). This is to be repeated in the following so that the feeder section switches are successively switched over as the vehicle advances and the linear motor units at which the vehicle exists are excited, to thereby drive the vehicle.

Figure 16:
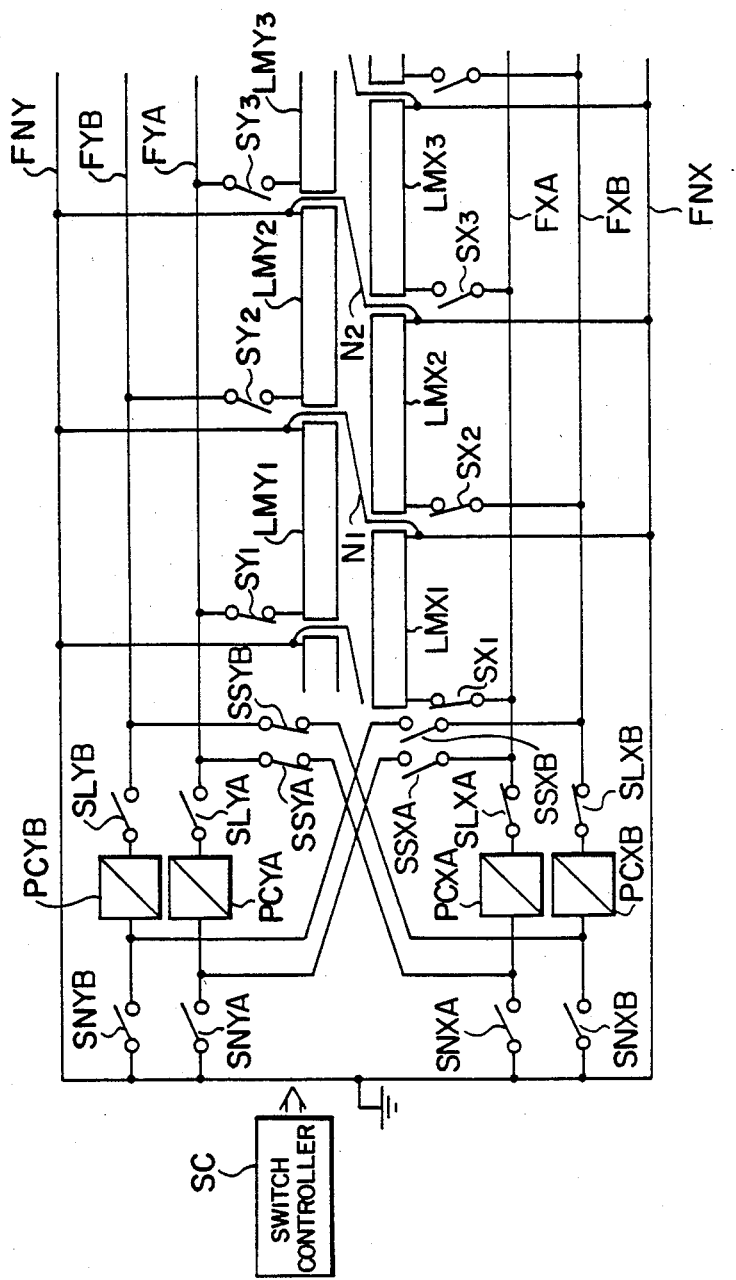
FIG. 16 is a circuit diagram showing a further embodiment according to the present embodiment.

FIG. 16 shows an embodiment which is a modification of the FIG. 13 embodiment and in which the linear motor units of the respective X- and Y-systems are offset from each other by the length of the vehicle or more. The drive coils of each of the X- and Y-systems may be arranged in two layers as in FIG. 2 or in one layer as in FIG. 3. In such an arrangement, the operation when the linear motor units of both the systems are serially excited by the power converter of one of the systems is not so different from the embodiment of FIG. 13. In the normal state, however, there is such an advantage as follows if the linear motor units of both the systems are excited by the power converters of both the systems. That is, as described above as to the FIG. 7 embodiment, the variations in composite apparent power of all the power converters due to the switching operation of the feeder section switches can be remarkably reduced by arranging the linear motor units offset between the X- and Y-systems in comparison with the case where the linear motor units are not offset. That is, there is an advantage that the influence of the power converters onto the AC input source side (variations in reactive power and variations in voltage) can be reduced.

Figure 17:
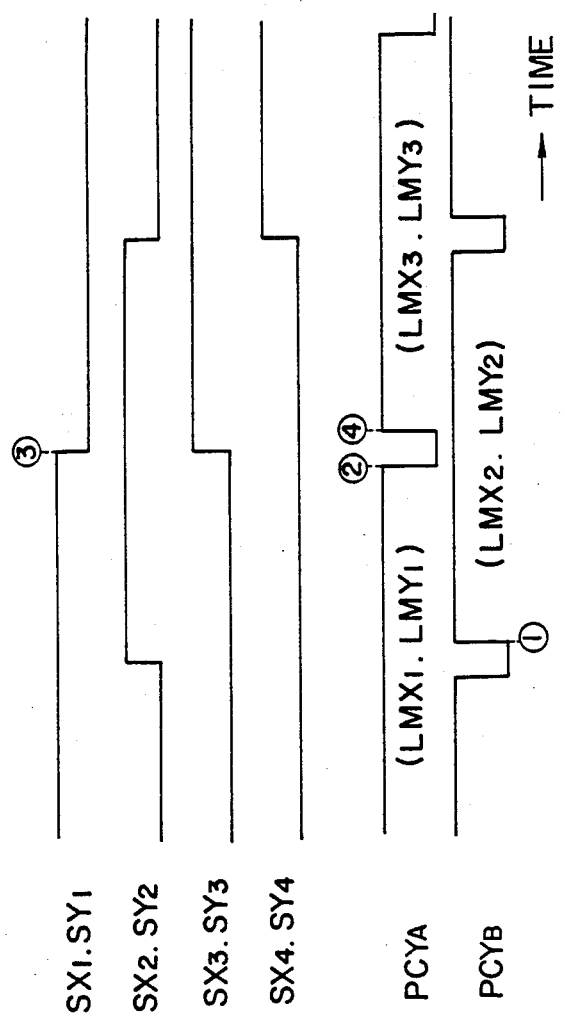
FIG. 17 is a time chart for explaining the operation of the embodiment of FIG. 16.

FIG. 17 is a flowchart for explaining the operation of the FIG. 16 embodiment. Referring to FIG. 17, description will be made hereunder as to the operation when the linear motor units of both the systems are serially excited by using the power converters PCYA and PCYB of the Y-system without using the power converters of the X-system.

When the vehicle exists at the linear motor units LMX1 as well as LMY1, the feeder section switches SX1 and SY1 are closed and the linear motor units LMX1 and LMY1 are serially excited by the power converter PCYA. When the vehicle advances to reach a position immediately before the forward linear motor unit LMX2, the power converter PCYB is energized (at the time ① in FIG. 17) so as to serially excite the linear motor units LMX2 and LMY2 through the feeder section switches SX2 and SY2 which have been closed. If the vehicle further advances and has come out of the linear motor unit LMY1, the power converter PCYA which has been supplying power stops the power supply operation (at the time ② in FIG. 17). Then, the feeder section switches SX1 and SY1 are opened with no current flowing therethrough, and at the same time the feeder section switches SX3 and SY3 of the forward linear motor units LMX3 and LMY3 to which the vehicle will enter next are closed (at the time ③ in FIG. 17). When the vehicle reaches a position immediately before the linear motor unit LMX3, the power converter PCYA is energized to start the excitation of the linear motor units LMX3 and LMY3 (at the time in ④ FIG. 17). This is to be repeated in the following so that the feeder section switches are successively switched over as the vehicle advances and the linear motor units at which the vehicle exists are excited, to thereby drive the vehicle.

In the linear motor power supply apparatus performing the operAtion as described above with such an arrangement as FIG. 13 or 16, there advantages as follows. First, unlike the embodiments of FIGS. 10 to 12 in which parallel excitation is performed, the linear motor units of the respective power supply systems are serially excited in case of failure in power converter, the excitation is not affected by the unbalance in induced voltage of the respective linear motor units between the systems so that it is possible to allow the same current to flow in the linear motor units of the respective systems. Accordingly, the variations in propelling or driving force can be reduced in comparison with the case of FIGS. 10 to 12.

Next, an advantage in practical use of this linear power supply apparatus when it is utilized in a magnetically floating type railway will be described hereunder. Passenger traffic demand is not constant but with considerable variations. To cope with such variations, it is general to adjust the train running interval or the number of rolling stocks in one train. In a so-called ground primary type linear motor driven railway in which propelling or driving coils are disposed along a track, however, it is necessary to provide one power converter corresponding to one train. That is, if a plurality of trains correspond to one power converter it becomes difficult to effect proper control. Accordingly, the running interval of the train can be reduced only within a range in which the above-mentioned principle is satisfied. It is therefore possible to cope with a small increase in passenger traffic demand by adjusting the running interval of the train. However, to cope with a large increase in passenger traffic demand, it is suitable to increase the number of rolling stocks in one train. Thus, in low passenger traffic demand, a train is formed to have a small number of rolling stocks and such a circuit arrangement as shown in FIGS. 13 or 16 is employed so that linear motor units of corresponding groups in both the systems are serially excited by power converters of one system while power converters of the other system are kept as spares for use in failure or in maintenance.

On the other hand, in high passenger traffic demand, a train of a large number of rolling stocks is employed and therefore the linear motor units of each system are excited by the power converters of the system because the induced voltage in each linear motor unit increases. That is, in FIGS. 13 or 16, the switches SSXA, SSXB, SSYA and SSYB are opened, the switches SNXA, SNXB, SNYA and SNYB are closed, and the switches SLXA, SLXB, SLYA and SLYB are closed. The operations of the feeder section switches and the power converters are performed in the same manner as described with respect to FIG. 8. Thus, there is an advantage that efficiently power supply can be against extreme variations in passenger traffic demand. Under the condition, if the power converter/converters of one system get out of order, the operation can be continued by using the power converters of the normal remaining system, while propelling or driving force decreases. If the running speed of train is reduced, it becomes possible to serially excite the linear motor units in the state of switches as shown in FIGS. 13 or 16.

Figure 18:
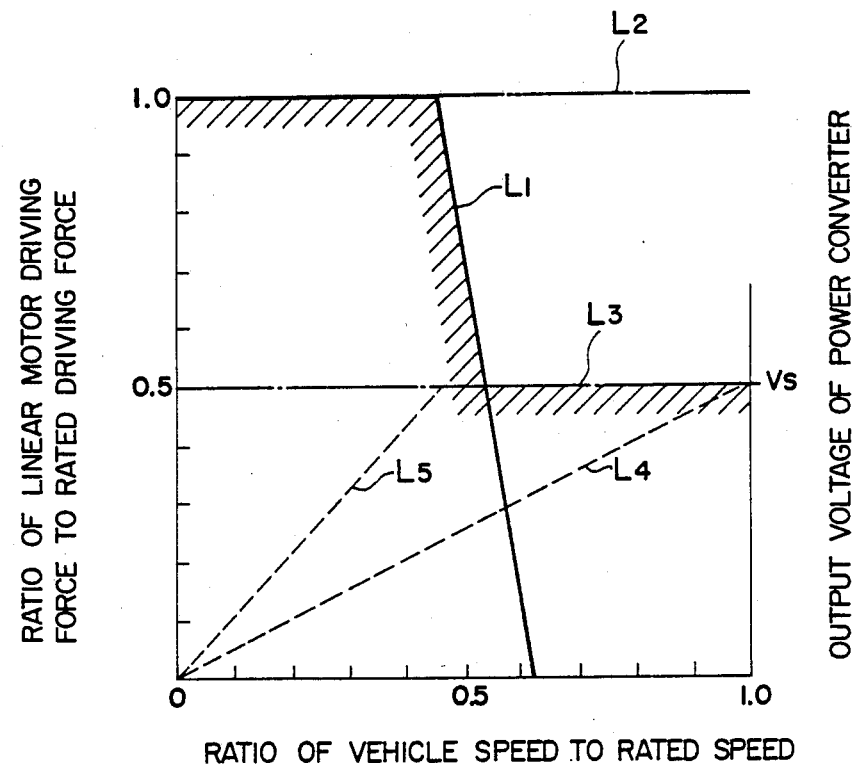
FIG. 18 is characteristic diagram of propelling or driving force in various operation modes of each embodiment of FIGS. 13 and 16.

In FIG. 13 or 16, upon failure of the power converter/converters of one system, it is possible to serially excite the linear motor units of both the systems by the power converter/converters of the other system as shown by way of example in FIG. 14B. The linear motor unit driving characteristic in such serial excitation is shown by a solid line L1 in FIG. 18. In FIG. 18, the abscissa represents the ratio of vehicle speed to rated speed, and the ordinate represents the ratio of linear motor driving force to rated driving force and the output voltage of power converter. The propelling or driving force obtained by exciting the linear motor units of each system by the power converters of the system in the normal state (this propelling force being assumed to be 1.0) is shown by a two-dotted chain line L2. In the case of serial excitation, although the same rated propelling or driving force as the normal case can be obtained in low and middle speed ranges, if the speed decreases to about 50% of (e.g., a middle speed), the output voltage of the power converter becomes saturated and the propelling or driving force rapidly decreases. This is because although the output voltage of the power converter gradually rises as shown by a broken line L4 when the power converters of one system excite only the linear motor units of the one system, if the power converters of one system serially excite the linear motor units of both the systems, the output voltage increases rapidly as shown by a broken line L5 to about two times as large as that shown by the broken line L4 as the speed increases so as to reach the saturated voltage value Vs at a speed of about 50% of the rated one.

A one-dotted chain line L3 shows a propelling characteristic when one linear motor unit is excited by one power converter and about a half propelling force in comparison with the normal case (two-dotted line) can be obtained in all the speed ranges. Accordingly, it is desirable to excite the linear motor units of each system by the power converters of the system without performing serial excitation in the high-speed range. In this case the serial excitation change-over switches are opened, the output side and return path side switches of normal one system are closed, the output side switches of the other abnormal system are opened, and the power converters of the one system are energized.

Figure 19:
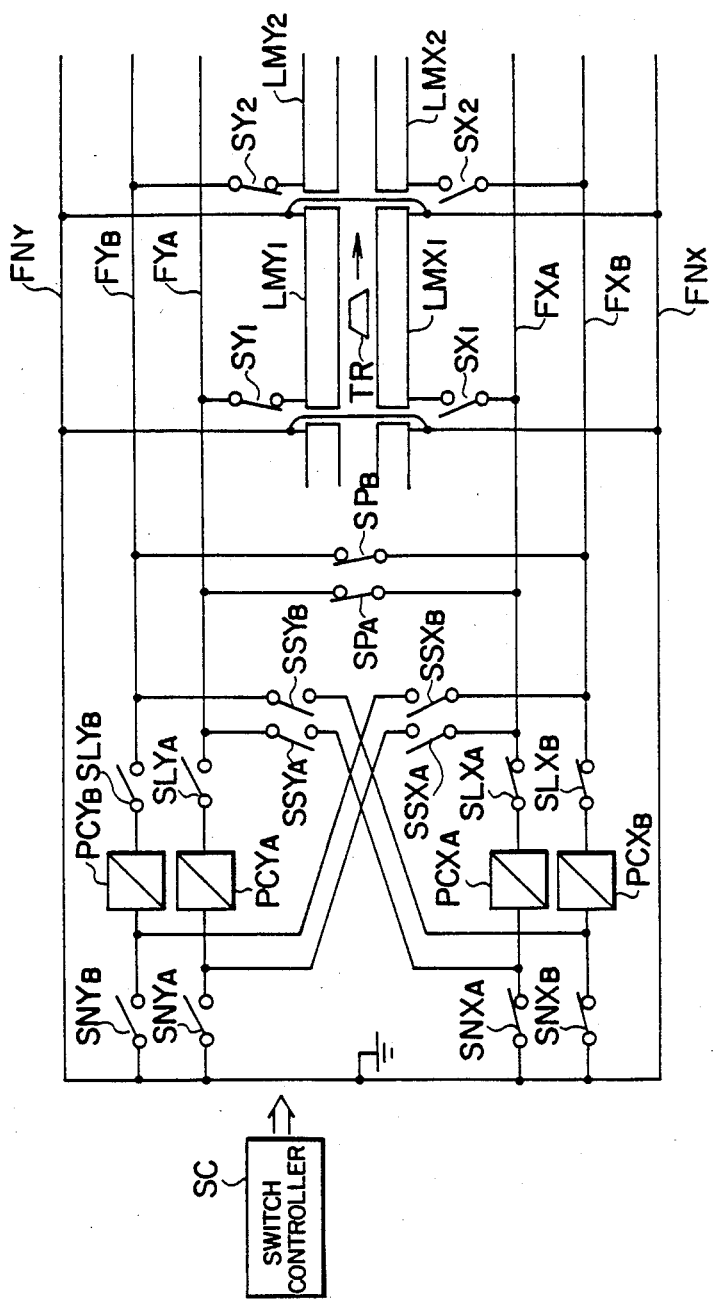
FIG. 19 is a circuit diagram showing a still further embodiment according to the present invention.

FIG. 19 shows another embodiment which is a modification of the embodiment of FIG. 13 and in which parallel connection switches SPA and SPB are additionally provided. In this embodiment, the corresponding linear motor units LMX1 and LMY1 of the corresponding groups of the X- and Y-systems are connected in opposite polarity to each other similarly to the embodiment of FIG. 13. Accordingly, serial excitation is performed in the same manner as in the embodiment of FIG. 13. Further, it is possible to attain an emergency operation in which linear motor units of one system can be excited by the other system, in the same manner as in the embodiment of FIG. 10. For example, in case where the power converter/converters of the Y-system and the linear motor unit/units of the X-system get out of order, the various switches are set in the state as shown in the drawing so as to make it possible to drive the vehicle in accordance with the driving characteristic as shown in FIG. 18 by a one-dotted chain line, by exciting the linear motor units of the Y-system by using the power converters of the X-system.

As described above, the present invention has an advantage that the vehicle running can be remarkably improved in reliability such that the vehicle can be run with continuous driving force without deterioration in comfort ride even in case a part of power converters or the like gets out of order.

Although description has been made above as to the embodiments in which mainly two power supply systems are provided and each power supply system is divided into two groups, these embodiment are illustrated merely by way of example and the present invention is not restricted to such embodiment but applicable to a power supply apparatus in which there are provided N power supply systems ($N \geq 2$) and each system is divided into M groups ($M \geq 2$).

We claim:

1. A power supply apparatus for a linear motor transportation system having a number of discrete linear motor units serially arranged along a track to generate a moving magnetic field for driving vehicle, said apparatus comprising:
   said linear motor units being divided into two power supply systems each subdivided into two groups such that each of said power supply systems includes a series of ones of said linear motor units, the series of said linear motor units in each of said power supply systems being successively allotted to different ones of said groups;
   four feeders provided respectively correspondingly to said two groups in each of said two power supply systems;
   feeder section switches for connecting respective one ends of said linear motor units in each of said groups with corresponding ones of said feeders;
   four power supply means provided respectively correspondingly to said groups in each of said power supply systems;
   four output side switches provided for connecting the respective outputs of said power supply means with corresponding ones of said feeders;
   four return path switches provided between return path side terminals of said respective four power supply means and said return feeders; and
   four switches for serial excitation provided in each of said two groups in each of said two power supply systems and each disposed between a feeder side terminal of said output side switch belonging corresponding one of said groups of corresponding one of said power supply systems and a return path side terminal of the power supply means belonging to said one group of the other power supply system;

in which a neutral point of each of said linear motor units of each of said groups of one of said power supply systems is connected with a neutral point of an adjacent one of said linear motor units of the corresponding group of the other power supply system, each linear motor unit of each group of one of said power supply systems is opposite in polarity to an adjacent one of said linear motor units of the corresponding group of the other power supply system, and the respective other ends of said linear motor units are connected with return path feeders, whereby in each of said power supply systems, the series of linear motor units are successively excited by corresponding one of said plurality of power supply means as said vehicle runs.

2. A power supply apparatus according to claim 1, in which adjacent linear motor units of corresponding groups of each of said power supply systems are arranged to be offset from each other in the direction of said track by a length not shorter than the length of said vehicle.

3. A power supply apparatus according to claim 1, in which when the vehicle speed of said vehicle is not higher than a middle speed, both said output side switches of both said power supply means of one of said power supply systems, two serial connection switches for connecting both return path terminals of both said power supply means of said one power supply system and both said feeders of the other power supply system, and all the return path side switches of both said power supply systems are opened, both said output side switches of both said power supply means of the other power supply system and two serial connection switches for connecting both return path terminals of both said power supply means of said other power supply system and both said feeders of the other power supply system are closed, and said linear motor units of each group of each of said two power supply systems are connected in series to each other through said closed output side switches and said closed serial excitation switches.

4. A power supply apparatus according to claim 1, in which when the vehicle speed of said vehicle is not lower than a middle speed, both said output side switches of both said power supply means of one of said power supply systems and all said serial connection switches are opened, both said output side switches of both said power supply means of the other one of said power supply systems and both said return path side switches are closed, and the linear motor units of each of said groups of the other power supply systems are successively excited.

5. A power supply apparatus for a linear motor transportation system having a number of discrete linear motor units serially arranged along a track to generate a moving magnetic field for driving vehicle, said apparatus comprising:

said linear motor units being divided into a plurality of power supply systems each subdivided into a plurality of groups such that each of said power supply systems includes a series of ones of said linear motor units, the series of said linear motor units in each of said power supply systems being successively allotted to different ones of said groups;

feeders provided respectively correspondingly to said groups in each of said power supply systems;

feeder section switches for connecting respective one ends of said linear motor units in each of said groups with corresponding ones of said feeders;

a plurality of power supply means provided respectively correspondingly to said groups in each of said power supply systems;

output side switches provided for connecting the respective outputs of said power supply means with corresponding ones of said feeders;

parallel connection switches provided for each of said groups of each of said power supply systems, each for connecting a feeder side terminal of the output side switch of the power supply means belonging to corresponding one of said groups of corresponding one of said power supply systems with a feeder side terminal of the output side switch of the power supply means belonging to the corresponding group of an other one of said power supply systems; and the respective other ends of said linear motor units being connected with return path feeders;

whereby in each of said power supply systems, the series of linear motor units are successively excited by corresponding one of said plurality of power supply means as said vehicle runs.

6. A power supply apparatus according to claim 5, in which adjacent linear motor units of corresponding groups of each of said power supply systems are arranged to be offset from each other in the direction of said track by a length not shorter than the length of said vehicle.

7. A power supply apparatus for a linear motor transportation system having a number of discrete drive coils each having a length shorter than a vehicle and serially arranged along a track to generate a moving magnetic field for driving the vehicle, said apparatus comprising:

k-th set of linear motor unit (k being each integer from 1 to N, N being an integer not smaller than 2), each linear motor unit being constituted by a predetermined number of serially connected drive coils of those selected every N-th one of said numbers of drive coils arranged in one row starting from the k-th one of said numbers of drive coils, said k-th set of linear motor units being associated with k-th power system;

said predetermined number of linear motor units being allotted to a plurality of groups one by one;

feeders provided respectively correspondingly to said groups in each of said power supply systems;

feeder section switches for connecting respective one ends of said linear motor units in each of said group with corresponding ones of said feeders;

a plurality of power supply means provided respectively correspondingly to said groups in each of said power supply systems;

output side switches provided for connecting the respective outputs of said power supply means with corresponding ones of said feeders;

parallel connection switches provided for each of said groups of each of said power supply systems, each for connecting a feeder side terminal of the output side switch of the power supply means belonging to corresponding one of said groups of corresponding one of said power supply systems with a feeder side terminal of the output side switch of the power supply means belonging to the corresponding group of an other one of said power supply systems; and the respective other ends of said linear motor units being connected with return path feeders;

whereby in each of said power supply systems, the series of linear motor units are successively excited by corresponding one of said plurality of power supply means as said vehicle runs.

8. A power supply apparatus according to claim 7, in which adjacent linear motor units of corresponding groups of each of said power supply systems are arranged to be offset from each other in the direction of said track by a length not shorter than the length of said vehicle.

* * * * *